United States Patent
Choi et al.

(10) Patent No.: US 6,871,079 B1
(45) Date of Patent: Mar. 22, 2005

(54) ANTENNA BUILT-IN TYPE MOBILE PHONE

(75) Inventors: Hyun Ki Choi, Bucheon (KR); Hee Jung Lee, Bucheon (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 09/672,781

(22) Filed: Sep. 29, 2000

(30) Foreign Application Priority Data

Oct. 1, 1999 (KR) .............................................. 99-42406

(51) Int. Cl.$^7$ .............................................. H04B 1/38
(52) U.S. Cl. ................ 455/550.1; 455/90.3; 455/575.7; 455/19; 343/720
(58) Field of Search .......................... 455/550.1, 575.7, 455/562.1, 128, 90.3, 347, 344, 343, 82, 129, 349, 351, 90.2, 73, 95, 13.3, 97, 127.1, 127.4, 121, 550, 575, 90, 346, 343.82, 575.1, 19, 562; 343/702, 895, 700 R, 705, 742, 745, 767, 872, 894, 867, 866; 342/66, 133; 324/66, 133

(56) References Cited

U.S. PATENT DOCUMENTS

| | | | | |
|---|---|---|---|---|
| 4,593,409 A | * | 6/1986 | Miller | 455/73 |
| 4,903,326 A | * | 2/1990 | Zakman et al. | 455/89 |
| 5,218,371 A | * | 6/1993 | Copeland et al. | 343/742 |
| 5,649,306 A | * | 7/1997 | Vannatta et al. | 455/575 |
| 6,028,555 A | * | 2/2000 | Harano | 343/702 |
| 6,181,283 B1 | * | 1/2001 | Johnson et al. | 343/702 |
| 2002/0000940 A1 | * | 1/2002 | Moren et al. | 343/702 |

FOREIGN PATENT DOCUMENTS

JP 01274519 A * 11/1989 ............ H04B/1/38

* cited by examiner

*Primary Examiner*—Edward F. Urban
*Assistant Examiner*—Charles Chow
(74) *Attorney, Agent, or Firm*—Fleshner & Kim, LLP

(57) ABSTRACT

An antenna built-in type mobile phone includes a mobile phone main body; and a battery detachably installed in the mobile phone main body and having an antenna at a predetermined position thereof. The battery includes a battery cell in a predetermined form, an antenna provided at the upper and the side portions of the battery cell, and a battery pack for holding the battery cell and the antenna.

5 Claims, 3 Drawing Sheets

ANTENNA BUILT-IN TYPE MOBILE PHONE

BACKGROUND OF THE INVENTION

1. Field of the Invention

The present invention relates to an antenna built-in type mobile phone.

2. Description of the Background Art

FIG. 1 is a schematic view of a general mobile phone in accordance with a conventional art.

As shown in the drawing, the conventional mobile phone includes a Helical antenna 1 fixedly installed at the upper end portion of a main body 3 and a monopol antenna 2 installed in a certain space of the mobile phone through the Helical antenna 1. For a telecommunication, the monopol antenna is pulled out, which has a length of $\lambda/4$.

When the user tries a telecommunication, current flows to the antenna, and electromagnetic wave is radiated toward a base station. In this respect, in case of using only the Helical antenna 1, without pulling out the monopol antenna 2, the resonant frequency of the antenna is adjusted with a called party. Meanwhile, in case of pulling out the monopol antenna 2 to increase the gain of the antenna, the resonant frequency is adjusted with a calling party.

Generally, downsizing of a mobile phone has a close relation with the size and the weight of the antenna. In line with the development of telecommunication techniques and increasing users' desire, mobile phones become compact and light rapidly, and in this respect, the antenna is paid much attention increasingly.

However. In order to build the monopol antenna in the main body of the mobile phone, a space is required in the mobile phone, which is disadvantageous in promotion of a compact and lightweight mobile phone.

In addition, since the antenna is fabricated through a number of processes, degrading the productivity.

Also, since the Helical antenna is installed to be outwardly protruded, it is inconvenient in that when users pull out the mobile phone, the antenna may be caught on a pocket of clothes or in a bag. In order to overcome the defects, in case of shortening the antenna, the frequency gain is reduced, degrading the performance of the mobile phone.

SUMMARY OF THE INVENTION

Therefore, an object of the present invention is to provide an antenna built-in type mobile phone which is directed to accomplish a compact size and light weight.

Another object of the present invention is to provide an antenna built-in type mobile phone which is capable of enhance a productivity by virtue of a simple fabrication process.

To achieve these and other advantages and in accordance with the purpose of the present invention, as embodied and broadly described herein, there is provided an antenna built-in type mobile phone including a mobile phone main body; and a battery detachably installed in the mobile phone main body having an antenna at a predetermined position therein.

In the antenna built-in type mobile phone of the present invention, the battery includes a battery cell in a predetermined form, an antenna provided at the upper and the side portions of the battery cell, and a battery pack for holding the battery cell and the antenna.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
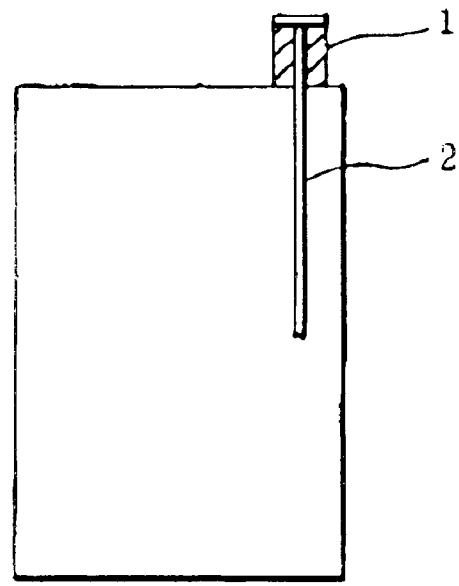
FIG. 1 illustrates a general mobile phone in accordance with a conventional art.
Figure 2:
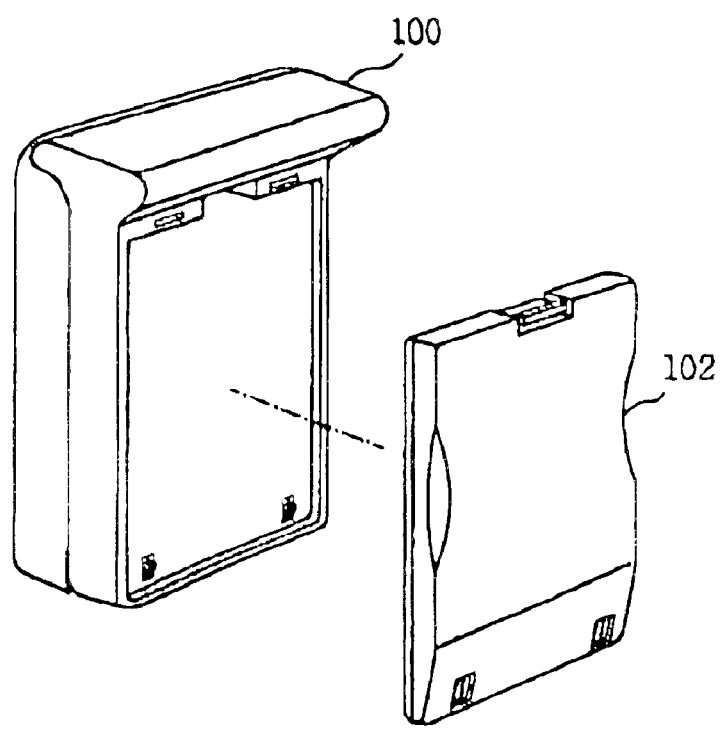
FIG. 2 is a perspective view of an antenna built-in type mobile phone in accordance with the present invention.
Figure 3:
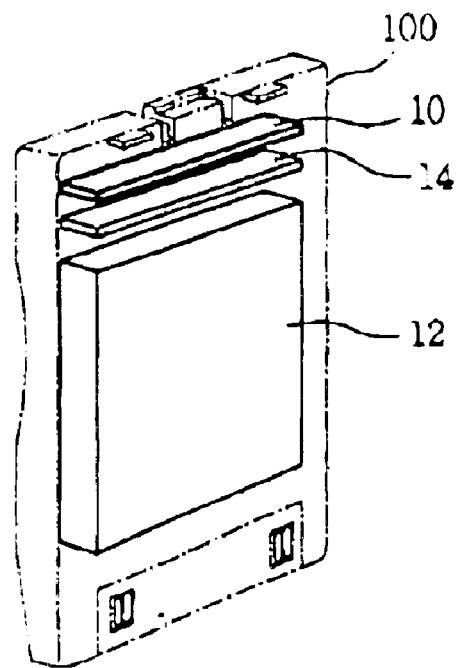
FIG. 3 is a perspective view of an antenna provided at a certain position of the upper portion of the battery of FIG. 2 in accordance with the present invention.
Figure 4:
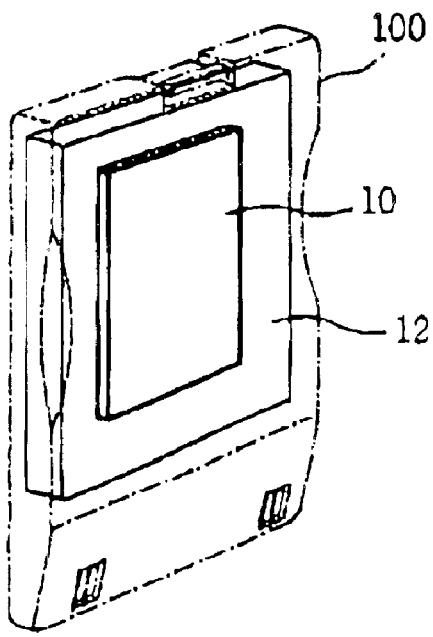
FIG. 4 is a perspective view of an antenna provided at a certain position of the side portion of the battery of FIG. 2 in accordance with the present invention.

FIG. 2 is a perspective view of an antenna built-in type mobile phone in accordance with the present invention, FIG. 3 is a perspective view of an antenna provided at a certain position of the upper portion of the battery of FIG. 2 in accordance with the present invention, and FIG. 4 is a perspective view of an antenna provided at a certain position of the side portion of the battery of FIG. 2 in accordance with the present invention.

As shown in FIG. 2, the antenna built-in type mobile phone of the present invention is inserted in a battery 102 detachably attached to the mobile phone, rather than being provided in a main body 100 like in the conventional art.

In detail, with reference to FIG. 3, the antenna 10 is positioned in a predetermined area of the upper portion of the battery cell 12. A dielectric substance 14 is inserted between the antenna 10 and the battery cell 12, or there remains a space between the antenna 10 and the battery cell 12, in which air serves as a dielectric. The antenna 10 and the battery cell 12 are inserted within a battery pack (not shown).

As shown in FIG. 4, the antenna may be positioned at the side portion of the battery cell 12. In this case, the antenna is positioned at the outer side of the battery cell 12 in consideration of a frequency characteristic.

The reason for this is that if the antenna is installed at the inner side of the battery cell 12, when the battery 102 and the main body 100 are combined, the antenna 10 becomes closely adhered to the main body 100, deteriorating a frequency characteristic.

Figure 5A:
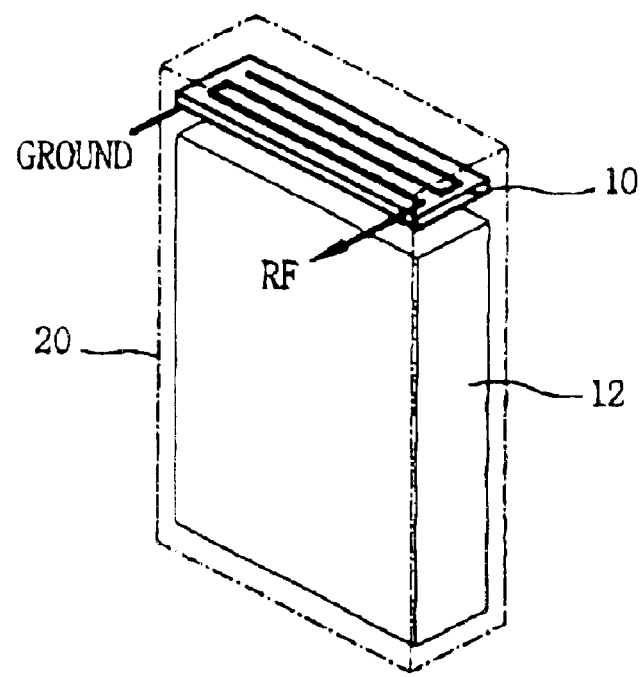
FIGS. 5A and 5B illustrate forms of antenna in accordance with the present invention.
Figure 5B:
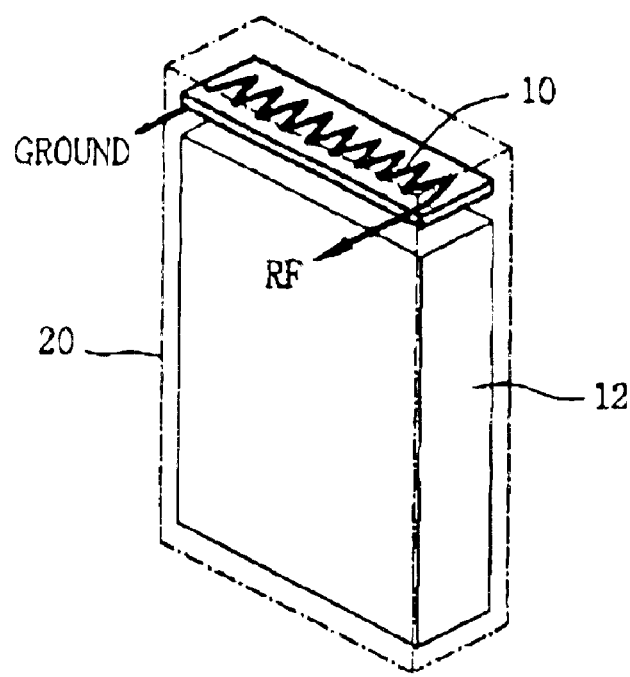

FIGS. 5A and 5B illustrate forms of antenna in accordance with the present invention.

As shown in the drawing, the antenna 10 is implemented with a linear or a zigzag-shaped wire. And, the antenna 10 may be formed in a circular or an oval form as required. One terminal of the antenna 10 is electrically connected with a radio frequency (RF) processing unit of the mobile phone main body 100, while the other terminal thereof is grounded. At this time, the thickness of the wire of the antenna can be adjusted as required, for which a single or a plurality of wires may be used as required.

As so far described, according to the antenna built-in type mobile phone of the present invention, since the antenna is built in the battery which is detachably attached to the mobile phone, so that the mobile phone can be more compact and lightweight.

In addition, by building the antenna in the battery, the mobile phone can be more convenient to use. And, its productivity can be more improved by removing the complicate processes to provide the antenna in the main body of the mobile phone.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A battery of a mobile phone comprising:

a battery cell;

an antenna electrically connected with a mobile phone main body and implemented at a predetermined position adjacent to the battery cell; a dielectric substance placed between the antenna and the battery cell; and a battery pack holding the battery cell and the antenna therin, wherein the antenna is formed by a plurality of wires that lie in a plane that extends parallel to an upper surface of the battery cell, in a predetermined area above the dielectric substance and below the upper surface of the battery pack.

2. The battery according to claim 1, wherein a dielectric substance or a space exists between the antenna and the battery cell.

3. The battery according to claim 1, wherein the antenna is positioned at an upper portion of the battery cell.

4. The battery according to claim 1, wherein a side surface of the battery cell is an outer side surface of the battery.

5. The battery according to claim 1, wherein the antenna is of a linear or a zigzag shape.

* * * * *